Feb. 26, 1952     H. A. ORTEGREN     2,586,987
ROLL HONING MACHINE

Filed April 13, 1950     9 Sheets-Sheet 1

Inventor
Herman A. Ortegren

Barthel & Bugbee
Attorneys

Feb. 26, 1952
H. A. ORTEGREN
2,586,987
ROLL HONING MACHINE
Filed April 13, 1950
9 Sheets-Sheet 2
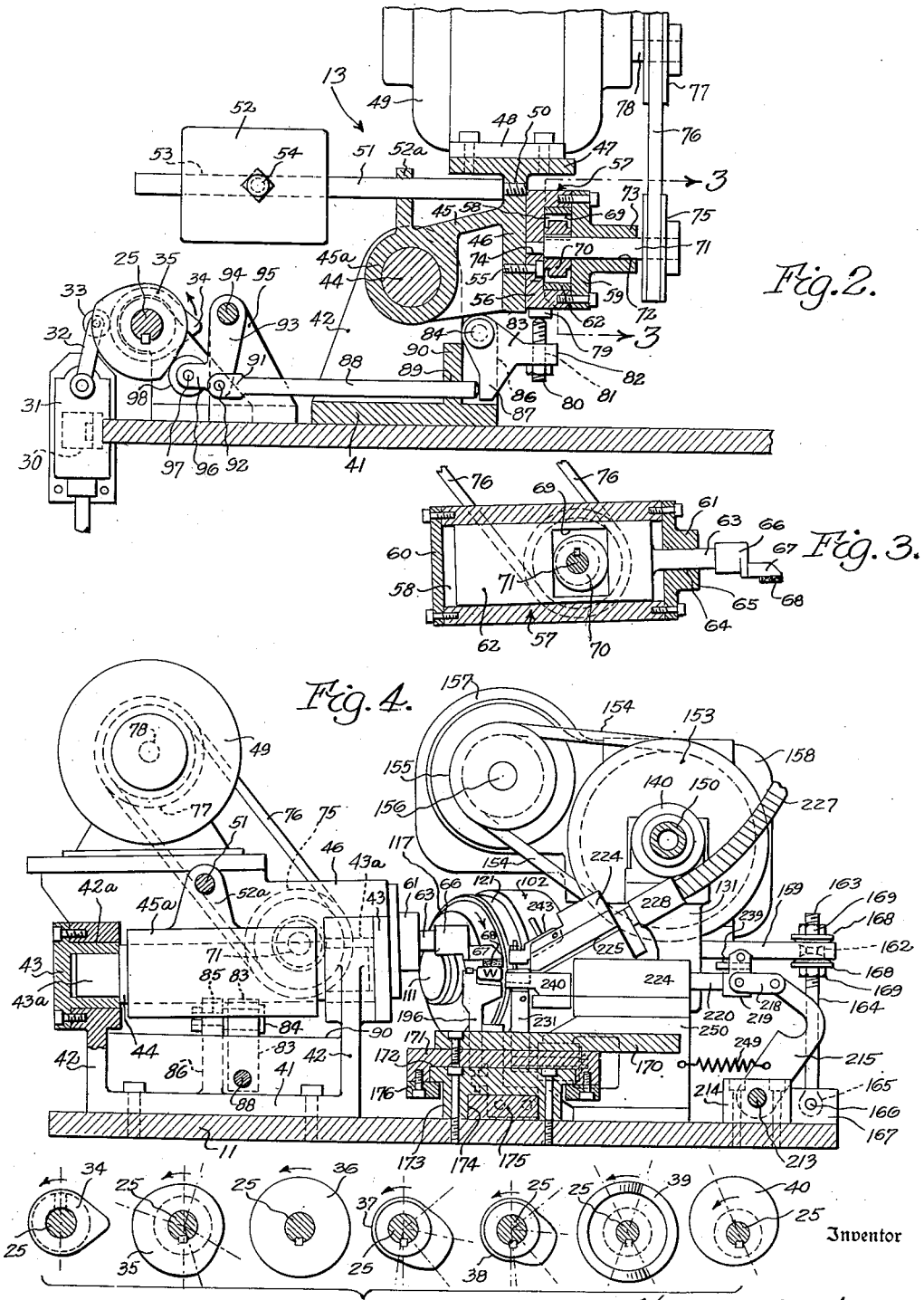
Inventor
Herman A. Ortegren
Barthel & Bugbee Attorney

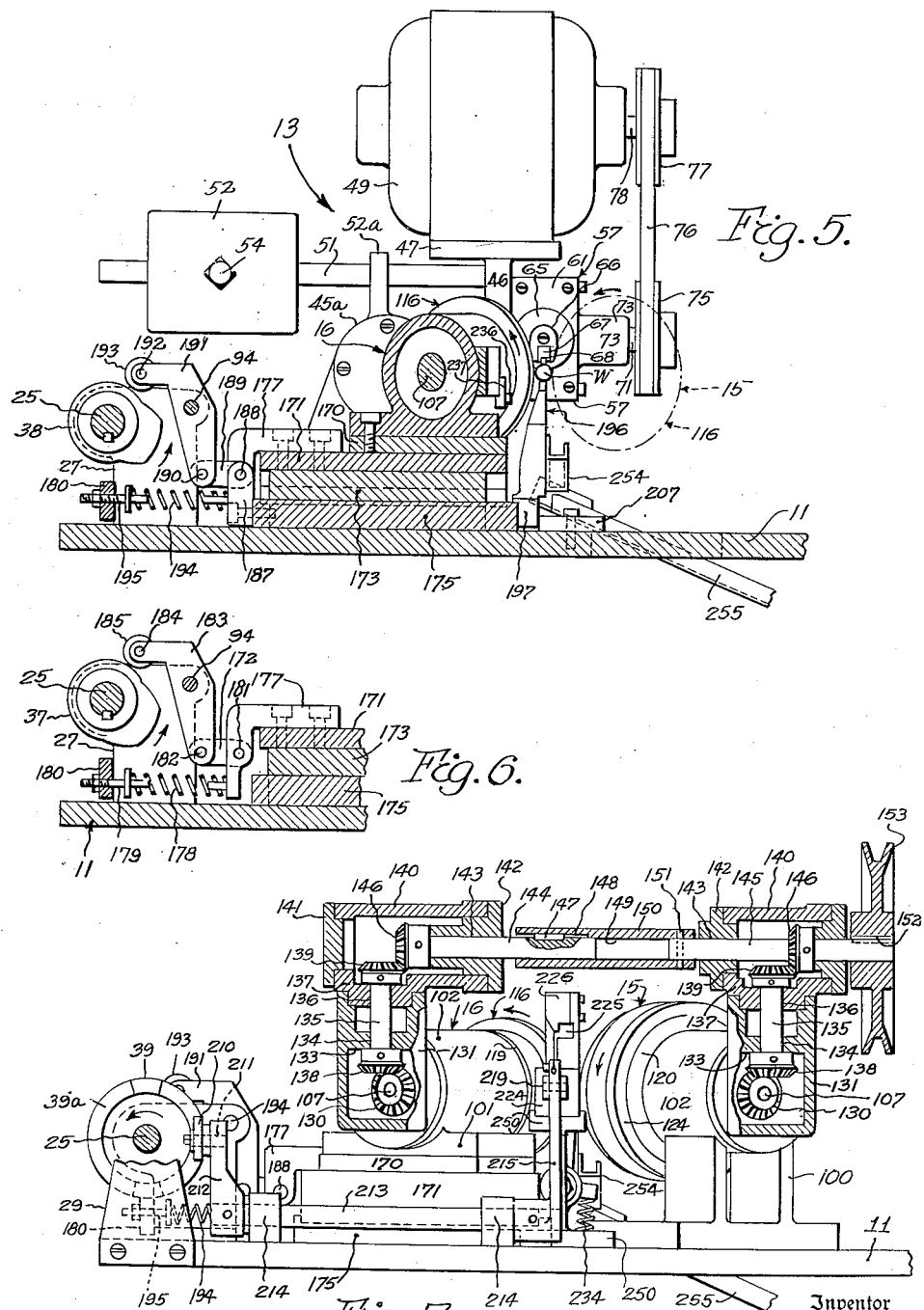

Feb. 26, 1952

H. A. ORTEGREN 2,586,987

ROLL HONING MACHINE

Filed April 13, 1950

Inventor
Herman A. Ortegren
By Barthel + Bugbee
Attorneys

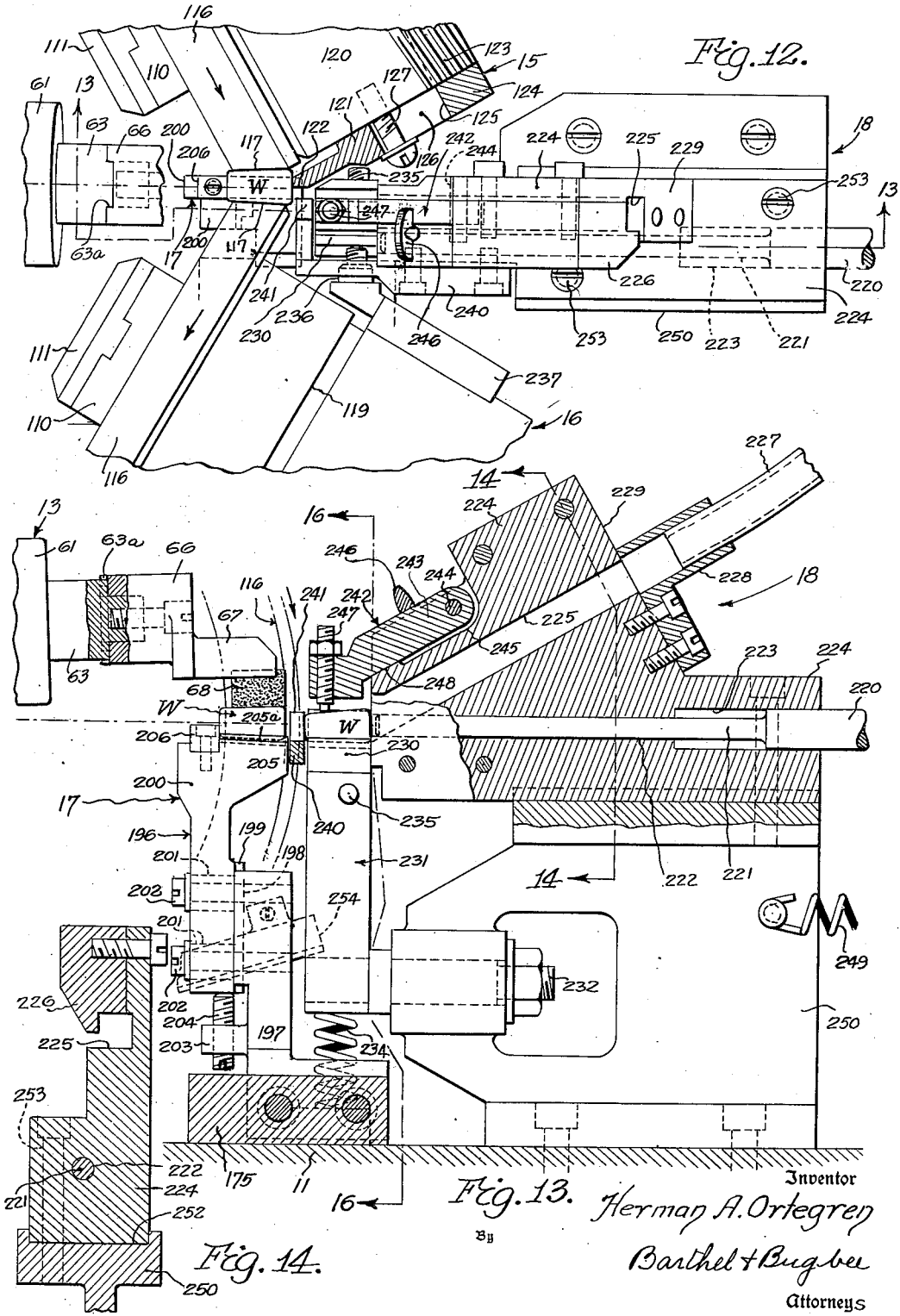

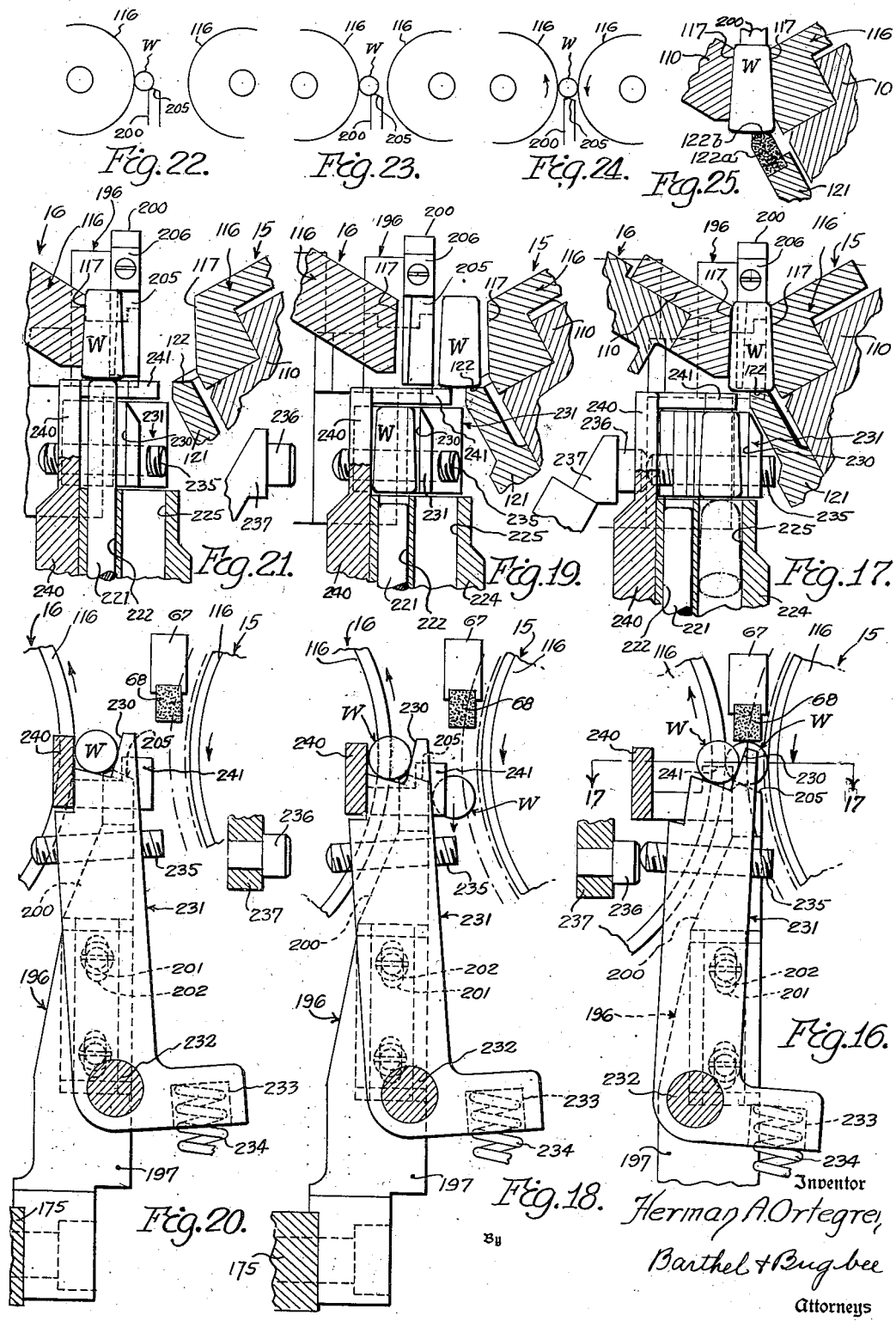

Feb. 26, 1952      H. A. ORTEGREN      2,586,987
ROLL HONING MACHINE
Filed April 13, 1950      9 Sheets-Sheet 7
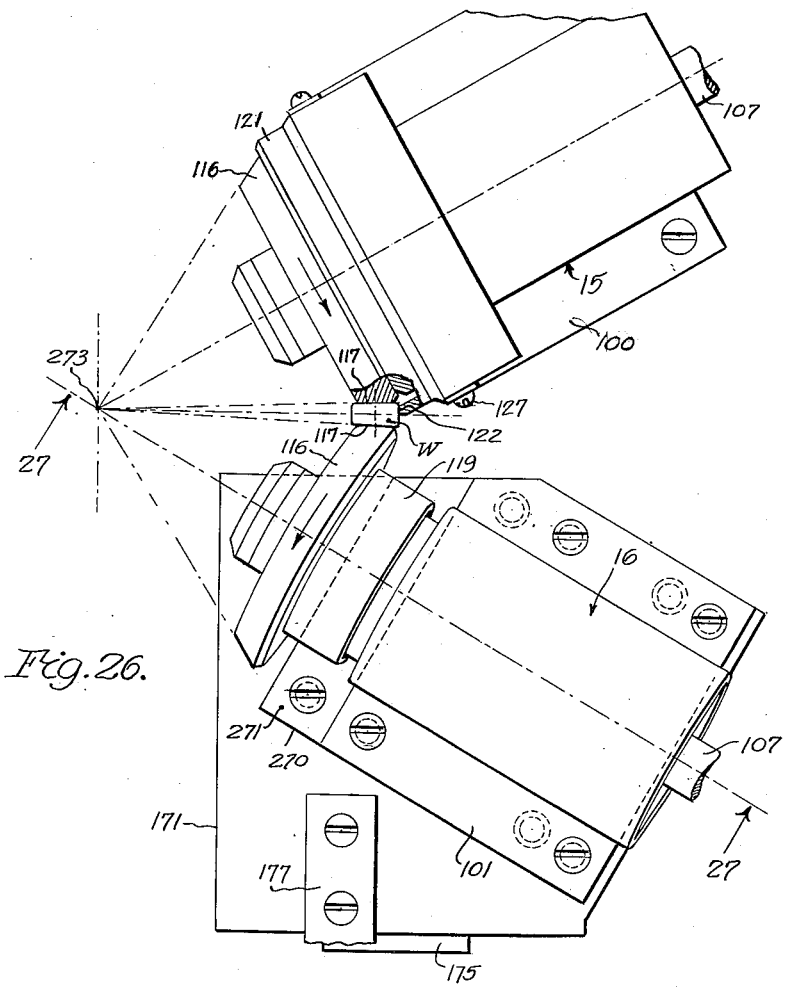
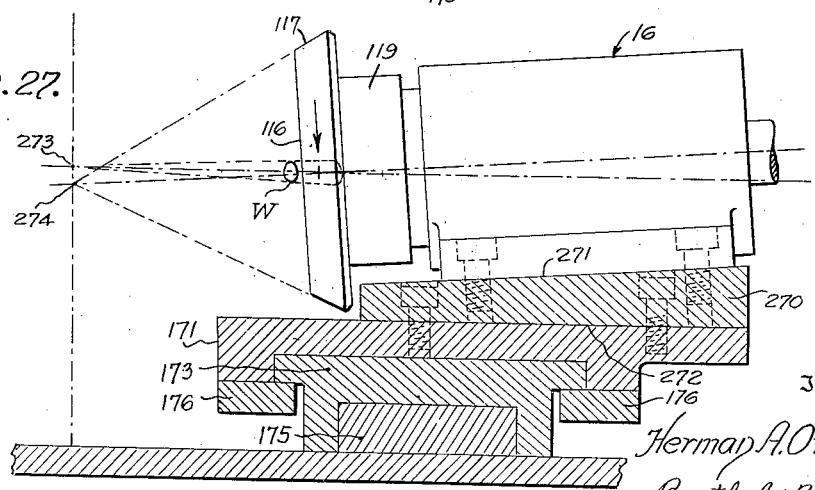
Inventor
Herman A. Ortegren
Barthel & Bugbee
Attorneys

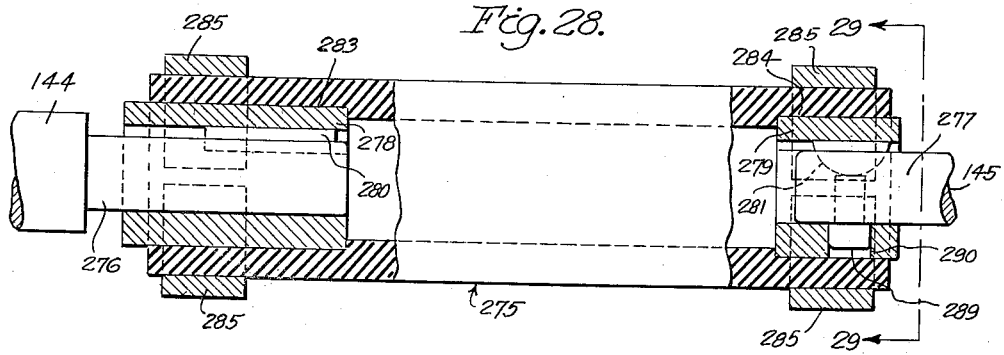
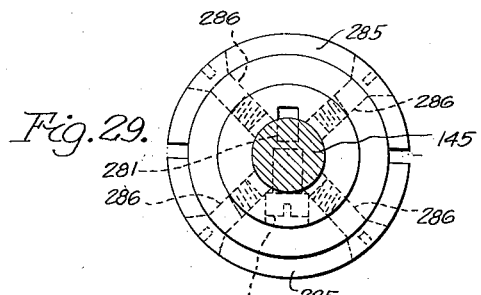
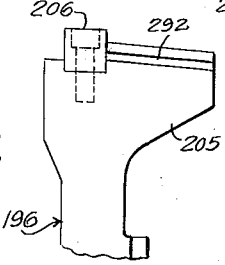
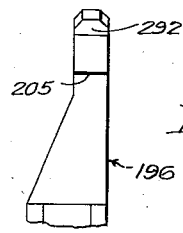
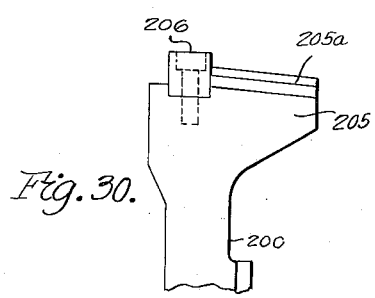
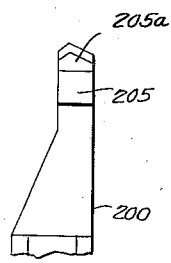

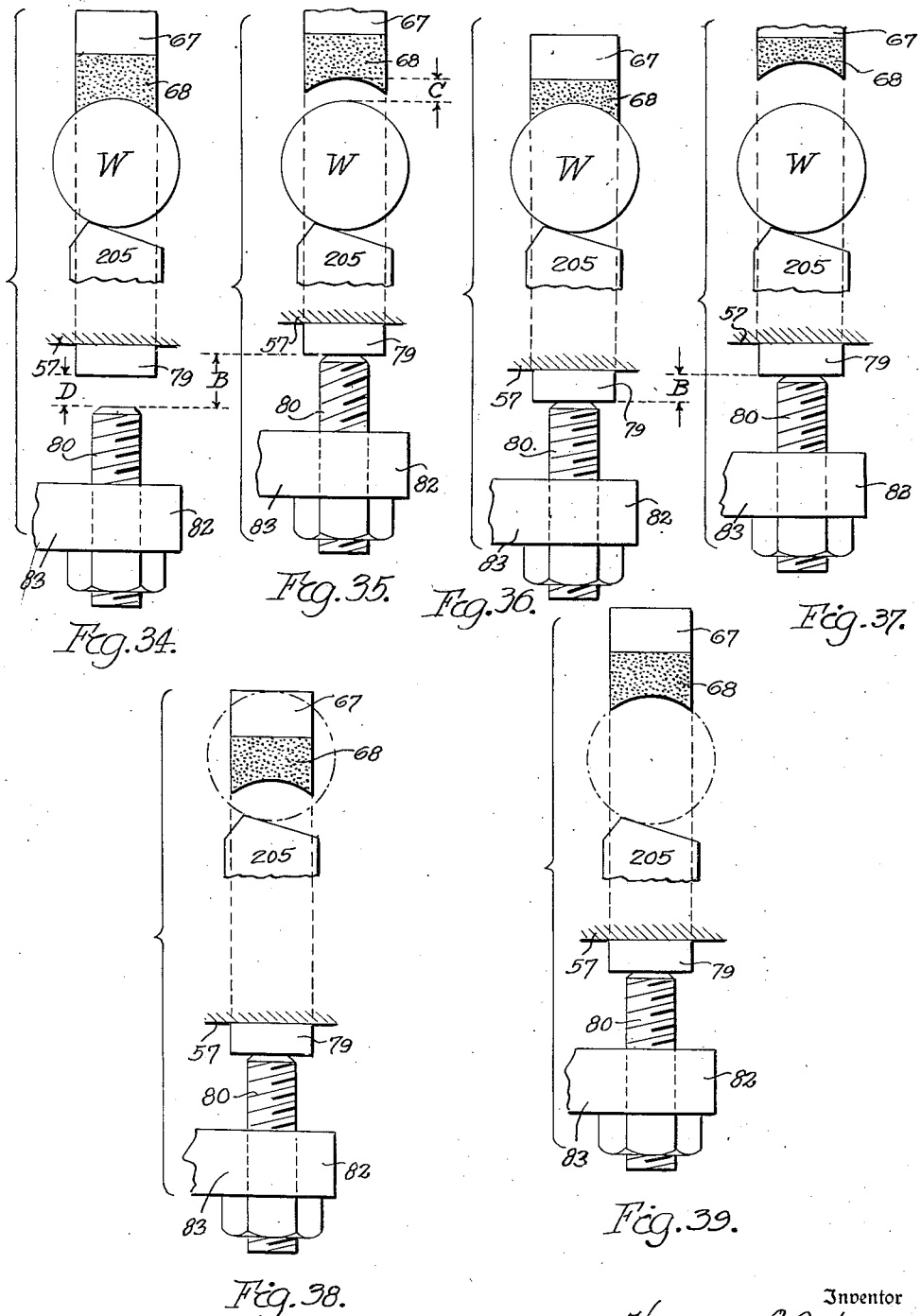

Patented Feb. 26, 1952

2,586,987

UNITED STATES PATENT OFFICE 2,586,987

ROLL HONING MACHINE

Herman A. Ortegren, Grosse Pointe, Mich., assignor to Bower Roller Bearing Company, Detroit, Mich., a corporation of Michigan Application April 13, 1950, Serial No. 155,617

24 Claims. (Cl. 51—3)

This invention relates to roller bearing manufacturing machines and, in particular, to tapered roller honing machines.

One object of this invention is to provide a tapered roller honing machine which operates automatically to simultaneously hone the tapered body surface and spherical end surface of a tapered anti-friction bearing roller so as to improve its finish and geometric accuracy and therefore improve its quietness of operation.

Another object is to provide a tapered roller honing machine wherein the tapered roller is loaded automatically upon a transfer device with the same end always foremost, and shifted onto a work rest into engagement with a pair of tapered driving wheels while an oscillating hone finishes its tapered surface and a lapping or honing ring mounted on one of the driving wheels finishes its end surface, the apex of each driving wheel and the apex of the tapered roller coinciding at a common point and the work rest and hone being aligned with this point of coincidence.

Another object is to provide a tapered roller honing machine wherein one end of the tapered roller is lapped by an abrasive lapping ring or honed by a ring-shaped honing stone attached to one of the roller-driving wheels and optionally having a curved abrading surface of the same radius as the radius of the spherical roller end surface, an adjustment being provided to place the center of curvature of the abrading surface in coincidence with the apex of the tapered driving wheel surfaces.

Another object is to provide a bearing roller honing machine wherein the finished roller is rapidly discharged automatically at the end of a predetermined honing or lapping period and an unfinished roller rapidly loaded onto the work rest, mechanism being provided for preventing a roller from being accidentally loaded with its wrong end foremost.

Another object is to provide a tapered roller honing machine wherein the oscillating hone is automatically compensated for wear.

Another object is to provide a tapered roller honing machine equipped with cam-operated mechanism including cams timed to position the roller for loading, to load the roller, to position the roller for honing, to position the honing units for honing, to hone the roller, to retract the honing unit, and to retract one of the driving wheels and the work rest so as to discharge the finished roller.

Another object is to provide a tapered roll honing machine of the foregoing character, wherein means is provided for tilting the axis of rotation of one of the driving wheels relatively to the other driving wheel, so as to urge the end of the tapered roll against an end honing ring or stone, thereby exerting an increased axial pressure upon the roll and likewise causing the honing ring to maintain the spherical shape necessary for imparting such a spherical shape to the end of the roll.

Another object is to provide a tapered roll honing machine of the foregoing character, wherein the reciprocable hone or lap for honing or lapping the tapered side of the roll is mounted on a hinged bracket so as to be adjustable for wear of the hone or lap.

Another object is to provide a tapered roll honing machine of the foregoing character, wherein an electric timer and control switch are provided for halting the rotation of the cam shaft for a predetermined period of time during the honing operation, thereby temporarily suspending the roll loading and ejecting mechanism so as to insure a sufficiently long period of honing to produce a honed surface of satisfactory quality.

In the drawings:

Figure 2 is a vertical section along the line 2—2 in Figure 1, showing the mechanism for raising, lowering and reciprocating the hone;

Figure 3 is a fragmentary vertical longitudinal section taken along the line 3—3 in Figure 2, showing the hone reciprocating mechanism;

Figure 4 is a vertical section taken along the line 4—4 in Figure 1, showing details of the honing, roller driving and roller feeding mechanism;

Figure 5 is a vertical section, taken along the line 5—5 in Figure 1, showing details of the work rest, movable roller driving wheel and reciprocating hone, the fixed roller driving wheel being omitted but indicated diagrammatically in dotted lines so as to reveal the hone-reciprocating mechanism behind it;

Figure 6 is a fragmentary vertical section taken along the line 6—6 in Figure 1, showing the cam mechanism for reciprocating the movable roller driving wheel;

Figure 7 is a vertical section taken along the line 7—7 in Figure 1, showing the cam mechanism for feeding the rollers to the machine, also the mechanism drivingly interconnecting the two roller driving wheels;

Figure 12 is an enlarged fragmentary top plan view of the central portion of the machine shown in Figure 9, illustrating further details of the roller feeding, transfer and driving mechanism, with the roller delivery tube removed;

Figure 13 is a vertical section taken along the line 13—13 in Figure 12, showing the same mechanism with the hone and roller delivery tube in position;

Figure 14 is a partly vertical and partly inclined section taken along the line 14—14 in Figure 13, showing the roller delivery passageway and feed plunger;

Figure 15 is a composite view showing diagrammatically the various cams and brake in side elevation as mounted in their successive positions along the cam shaft shown in Figure 1 at the bottom thereof;

Figure 16 is an enlarged fragmentary rear elevation, partly in section, along the line 16—16 in Figure 13, showing the relative positions of the driving wheels, work rest and roller transfer member during the honing operation;

Figure 17 is a horizontal section taken along the line 17—17 in Figure 16;

Figure 18 is an enlarged fragmentary rear elevation similar to Figure 16, but showing the movable roller driving wheel, work rest and roller transfer member shifted to discharge the honed roll with another roller ready to be fed to the work rest;

Figure 19 is a horizontal section similar to Figure 17, but showing the parts in the positions of Figure 18;

Figure 20 is an enlarged fragmentary rear elevation similar to Figures 16 and 18, but showing the movable roller driving wheel shifted still further to facilitate feeding another roller onto the work rest;

Figure 21 is a horizontal section similar to Figures 17 and 19, but showing the parts in the position of Figure 20;

Figure 22 is a fragmentary rear elevation showing diagrammatically the parts in the same positions as Figure 20;

Figure 23 is a diagrammatic fragmentary rear elevation similar to Figure 22, but showing the movable driving wheel and work rest shifted toward the fixed driving wheel immediately before honing;

Figure 24 is a diagrammatic fragmentary rear elevation similar to Figures 22 and 23, but showing the movable driving wheel and work rest shifted into the final or honing position as in Figure 16;

Figure 25 is a view similar to Figure 17, omitting the work feeding and transfer mechanism but showing a modification employing a stone-like hone rather than a charged lap for finishing one end of the bearing roller;

Figure 26 is a top plan view of a modified arrangement of the driving units wherein the movable driving unit is tilted slightly to more forcibly urge the workpiece roller against the honing ring;

Figure 27 is a vertical section, partly in side elevation, taken along the line 27—27 in Figure 26;

Figure 28 is a central vertical section through a flexible driving connection between the fixed and movable roller driving units of the modification shown in Figures 26 and 27;

Figure 29 is a vertical section taken along the line 29—29 in Figure 28, showing the flexible driving connection chiefly in end elevation;

Figure 30 is a fragmentary side elevation of the work rest shown in Figure 14;

Figure 31 is a fragmentary front elevation of the work support and work rest shown in Figure 30;

Figure 32 is a fragmentary side elevation of a modified work support and work rest;

Figure 33 is a fragmentary front elevation of the modified work support and work rest shown in Figure 32;

Figure 34 is a diagrammatic elevational view showing the relationship and adjustment of the honing unit at the start of using a new honing stone, with the stone lowered into engagement with the workpiece;

Figure 35 is a view similar to Figure 34, but with the new stone raised to its retracted position from the workpiece, with the minimum permissible clearance therebetween;

Figure 36 is a view similar to Figure 34 with the parts shown in the position when the honing stone is worn down and requires replacement;

Figure 37 is a view similar to Figure 35, but with the worn out honing stone retracted;

Figure 38 is a view similar to Figure 34, but with the new stone lowered to its lowest position with no workpiece on the work rest; and Figure 39 is a view similar to Figure 38, but with the worn out stone lowered to its lowest position with no workpiece on the work rest.

*General arrangement*

Figure 1:
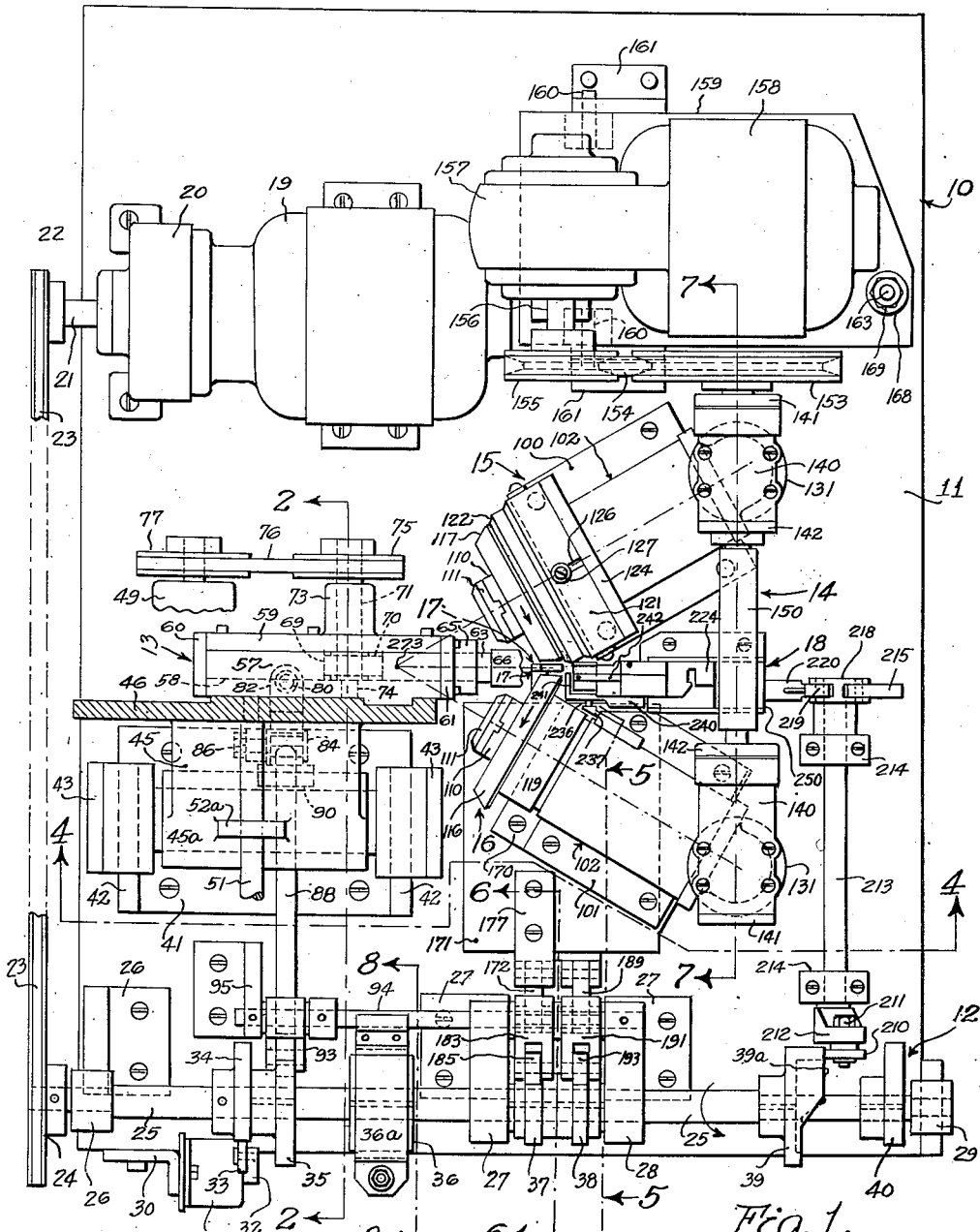
Figure 1 is a top plan view of a bearing roller honing machine, according to one form of the invention, with the hone counterweight, roller delivery tube, the hone-reciprocating motor and the hone omitted, so as to reveal more clearly the honing mechanism and work supporting and feeding structure and mechanism beneath them.

In general, the bearing roller honing machine 10 of this invention (Figure 1) consists generally of a bed 11 on which are mounted a cam shaft and cam unit 12 by which the various movements of the machine are operated in timed sequence and relationship, a honing unit 13 which applies a reciprocating hone to the surface of the bearing roller which is the workpiece handled by the machine, a roller driving unit 14 which in turn is subdivided into a fixed roller driving unit 15 and a movable roller driving unit 16, these driving units being operative to rotate the bearing roller rapidly while it is being honed. One of these driving units also carries a honing or lapping ring which simultaneously finishes one end of the tapered roller. When a lapping ring is used, a suitably curved face is provided, whereas when a ring-shaped honing stone is used, this is not necessary as the end of the roller W will rapidly generate a curved face on the stone. The width of the stone face must be within the spherical end of the roller under these circumstances. The machine further includes a work feeding unit 18 by which the bearing rollers or other workpieces are delivered to the work rest of the work supporting unit 17. Each of these units 13 to 18 inclusive, excepting the fixed roller driving unit 13, is actuated by cams included in the cam shaft and cam unit 12, in a manner described below.

The cam shaft and cam unit 12 is driven by a motor 19 bolted or otherwise secured to the bed 11 and having a reduction gear box 20 connected thereto, with an output shaft 21. The latter carries a pulley 22 which is engaged by a belt 23 which in turn drivingly engages a pulley 24 pinned or otherwise drivingly secured to the cam shaft 25. The latter is rotatably mounted in journal bearings 26, 27, 28 and 29 bolted or otherwise secured to the bed 11. Also bolted to the edge of the bed 11 is an angle bracket 30 carrying an electric limit switch 31 (Figure 2) having a swinging operating arm 32, the roller 33 of which is engaged by a switch-operating cam 34 mounted on and drivingly secured to the cam shaft 25. The cam shaft 25 is driven at the highest speed at which it is practical to load and unload work. As this speed may not allow sufficient time for honing, the limit switch 31 is provided which, when closed by the cam 34, serves to reset a solenoid-operated adjustable timer (not shown) which, in resetting, temporarily breaks the current supply circuit for the motor. When a predetermined time has elapsed sufficient to complete the honing operation, the timer restarts the motor to again rotate the cam shaft 25. Also drivingly secured to the cam shaft 25 is a hone rocking cam 35.

Figure 8:
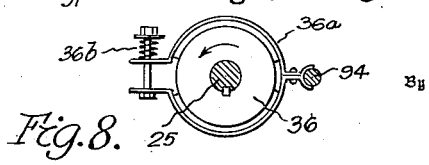
Figure 8 is a vertical section taken along the line 8—8 of Figure 1, showing a retarding brake for preventing overrunning of the cam shaft.

Further along on the cam shaft 25 is mounted a brake band 36a urged by a spring 36b into engagement with a brake drum 36 (Figure 8) which is keyed or otherwise drivingly secured to the cam shaft 25. This brake prevents overrunning of the cam shaft 25 due to its inertia; as the cam shaft 25 rotates only one revolution for each cycle of operation, no overheating of the brake 36 develops. Still further along on the shaft 25 and keyed or otherwise drivingly secured thereto are a movable drive unit reciprocating cam 37 and a work rest reciprocating cam 38, these two cams being located between the journal bearings 27 and 28. Keyed or otherwise drivingly secured to the cam shaft 25 between the journal bearings 28 and 29 is a workpiece feeding cam 39 for feeding the bearing rolls or other workpieces to the work rest, this feeding mechanism constituting a part of the work supporting and feeding unit.

Near the end of the cam shaft 25 adjacent the journal bearing 29 is keyed or otherwise drivingly secured a workpiece delivery cam 40, the latter being shown without its accompanying mechanism as this workpiece delivery mechanism is outside the scope of the invention. This workpiece delivery mechanism is conventional and is omitted in order to simplify the disclosure. A suitable roll delivery apparatus is described and claimed in the Hommel Patent 2,490,872 of December 13, 1949, for Article Handling Apparatus. Such workpiece delivery mechanism operates automatically to deliver the rollers one by one with their small ends always forward or downward, regardless of the position in which they are first presented to the mechanism.

*Roller honing unit construction*

The honing unit 13 includes a base 41 (Figures 2 and 4) bolted or otherwise suitably secured to the bed 11 and having spaced upstanding bearing brackets 42 bored as at 42a to receive cup-shaped bearing sleeves 43 at their upper ends. These pivotally support the reduced diameter ends 43a of a shaft 44 upon which the hub 45a of an arm 45 is mounted for rocking movement on an axis tilted to half the taper of the roller W. The arm 45 is provided with a vertical web 46 extending upward and terminating in a horizontal support 47 to which the base 48 of the hone operating motor 49 is bolted or otherwise suitably secured. The web 46 is provided with a horizontal threaded bore 50 into which the threaded end of a counter-balance rod 51 is threaded (Figure 2). Adjustably mounted on the counterbalance rod 51 is a counterweight 52 having a bore 53 therethrough for receiving the rod 51 and having a set screw 54 for locking the counterweight 52 in its adjusted position along the rod 51. An upstanding bar 52a assists in supporting the rod 51. The adjustable counterweight 52 enables the hone pressure on the workpiece W to be varied as desired.

Also secured to the web 46 as by the screws 55, is the housing 56 of a removable oscillator unit, generally designated 57 (Figure 2). The housing 56 has a cavity 58 therein of rectangular cross-section closed by a cover plate 59 and end plates 60 and 61 respectively (Figure 3). Reciprocably mounted in the cavity 58 is an elongated slide block 62 of rectangular cross-section slightly shorter in length than the length of the cavity 58 and having a stem 63 projecting forwardly from its forward end and passing through a bore 64 in a boss 65 on the front end plate 61. Removably bolted to the reduced-diameter front end of the stem 63 and interlocked therewith as at 63a (Figures 12 and 13) is an angle head or hone holder 66 with a forwardly-projecting arm 67 to which is cemented or otherwise secured a hone 68 of abrasive material, such as silicon carbide. The hone holder 66 may easily be changed to replace a worn-out hone 68 or to substitute one with a different abrasive characteristic.

The slide block 62 is provided with a rectangular opening 69 therethrough and in this is mounted a cam 70 (Figure 3) by which the slide block 62 and hone 68 are reciprocated. The cam 70 is keyed or otherwise drivingly secured to a shaft 71 which is journaled in a bore 72 formed in a boss 73 (Figure 2) projecting outward from the cover plate 59. The shaft 71 at its inner end is reduced in diameter and journaled in a bore 74 in the side wall 56 of the hollow guide member 57. Keyed or otherwise drivingly secured to the outer end of the shaft 71 is a pulley 75 which is driven by a belt 76 from a pulley 77 which is keyed or otherwise drivingly secured to the armature shaft 78 of the motor 49. Thus, when the motor 49 is energized and rotates the shaft 71 and cam 70 (Figure 3), the slide block 62 moves to and fro, carrying with it the hone 68. The oscillator unit 57 thus has an independent drive and the oscillations of the honing head 66 may be varied without affecting other moving parts. The oscillator unit 57 may be replaced as a unit by one with a different stroke, if desired. The bracket structure on which the honing unit 13 is mounted may be adjusted axially as well as radially to allow for close setting of the honing stone 68 relatively to the roller W.

In order to raise and lower the arm 45 (Figure 2) to cause it to swing around the shaft 44 in the journal bearings or bearing sleeves 43, rocking mechanism driven by the cam 35 is provided as shown in Figure 2. For this purpose, a contact button 79 secured to the bottom of the hollow guide member 57 is engaged by a screw 80 threaded through a bore 81 in the end of one arm 82 of a bell crank 83 which is pivoted on a pivot bolt 84 mounted in a bore 85 in a vertical bracket 86 (Figure 4), extending upward from the base 41. The other arm 87 of the bell crank 83 is engaged by a push rod 88, the forward end portion of which passes through a guide bore 89 in a web 90 extending between the brackets 42. The opposite end of the push rod 88 is provided with a clevis 91 carrying a pin 92 (Figure 2) by which the rod 88 is pivotally connected to a cam follower arm 93. The latter is loosely and pivotally mounted on a stationary shaft or pivot rod 94 which is supported at one end by a bracket 95 bolted to the bed 11 (Figures 1 and 2) and at its other end by the bracket 28, intermediate support being also given by the bracket 27 (Figure 1). The arm 93 is provided with ears 96 carrying a pivot pin 97 (Figure 2) upon which a cam follower roller 98 is rotatably mounted. The roller 98 engages the periphery of the cam 35.

*Roller driving unit construction*

The roller driving unit 14, as previously stated, is subdivided into a fixed roller driving unit 15 and a movable roller driving unit 16 (Figures 4 to 7 inclusive). The two roller driving units 15 and 16 are of similar construction, except for the fact that one is movable and the other is stationary, hence a single description will suffice, in large part, for both units. The units 15 and 16 are mounted upon base structures 100 and 101 respectively and each includes a horizontal approximately cylindrical housing 102 (Figure 9) having coaxial bores 103 and 104 in the end walls 105 and 106, these bores 103 and 104 rotatably supporting shafts 107. Each shaft 107 has a tapered end 108 secured in the correspondingly tapered bore 109 in a roll driving wheel 110, by a retaining disc 111 with a retaining screw 112 threaded into a threaded bore 113 in the end of the shaft 107. Secured as by the screws 118 to the stepped periphery 114 of each wheel 110 (Figure 9) is the correspondingly stepped interior 115 of a contact ring or roller driving ring 116 having a conical roller driving surface 117.

The driving wheels 110 of the movable and fixed drive units 16 and 15 are provided with rearwardly-extending skirts 119 and 120 respectively. The skirt 120 carries a roller end lapping or honing ring 121 (Figure 9) secured thereto by screws 127 in circumferentially spaced slots 128 and having a beveled forward abrading face 122 adapted to lap or hone the large end of the roller or workpiece W (Figure 9) with a spherically-curved surface. The ring 121 for lapping may be made of cast nickel iron charged with a suitable abrasive, whereas for honing it carries an annular honing stone 122a (Figure 25) of suitable abrasive material cemented or otherwise secured to the ring 121 and having an abrading edge 122b. When the lapping ring 121 is used, it is provided with a suitably-curved face 122, but when the honing stone 122a is used, this is not necessary, as the end of the roller W will rapidly generate a curved face on the stone, as stated above. The abrading edge 122b is formed with a corresponding curvature.

The rearward portion of the skirt 120 is threaded as at 123 to receive a threaded adjusting ring 124 which engages the rearward edge 125 of the lapping or honing ring 121. By loosening the screws 127, the honing ring 121 may be moved forward or backward to accurately position the ring 121 relatively to the apex 213, as described below in connection with the operation of the machine. The ring 124 may be provided with recesses (not shown) for receiving the pins of a spanner by which it may be rotated in one direction or the other in order to precisely adjust the position of the honing ring 121. When this has been done, the screws 127 are tightened to lock the hone ring 121 in its adjusted position.

Figures 9, 10, 11:
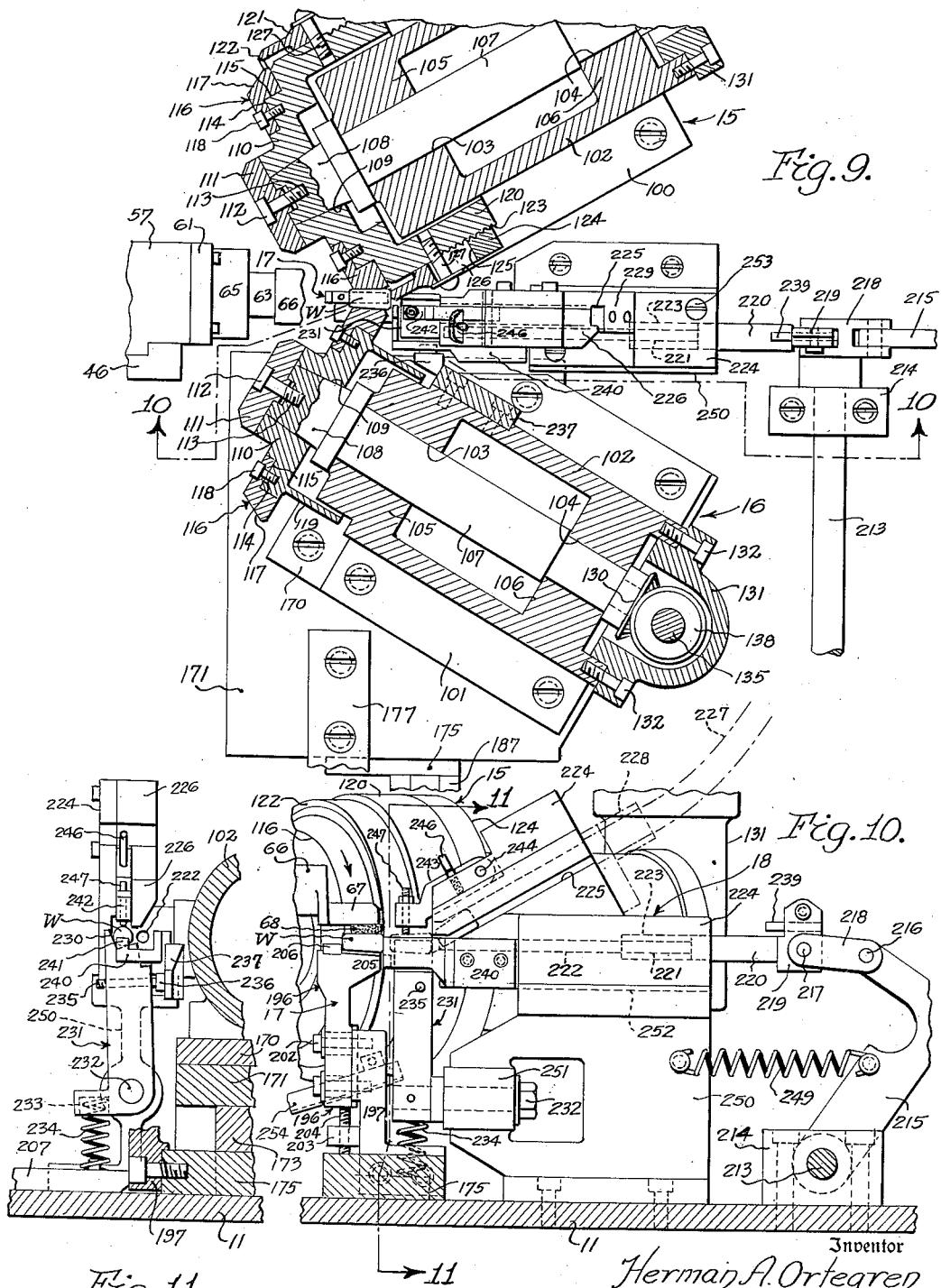
Figure 9 is a horizontal section through the plane of the axes of rotation of the roller driving wheels, showing details of the wheel driving mechanism and roller feeding and transfer mechanism.
Figure 10 is a vertical section taken along the line 10—10 in Figure 9, showing the same mechanism in side elevation.
Figure 11 is a fragmentary vertical section taken along the line 11—11 in Figure 10, showing the roller feeding and transfer mechanism in front elevation.

The fixed and movable roller driving units 15 and 16 are mounted with their shafts 107 arranged at acute angles to one another (Figures 1 and 9) so that the contact or roller driving surfaces 117 of their driving rings 116 are arranged at the same angle as the taper of the roller W which they are intended to rotate. In order to drive the shafts 107 simultaneously and in the same directions, each shaft 107 at its rearward end carries a bevel gear 130 keyed or otherwise drivingly secured thereto (Figures 7 and 9). Each bevel gear 130 extends into the interior of a hollow gear housing 131 which is secured as at 132 to the rearward end of the housing 102 and which extends upward in a substantially vertical direction (Figure 7). The housing 131 contains a web 133 which is bored as at 134 to rotatably support the lower end of a vertical shaft 135, the upper end of which is rotatably supported in a corresponding bore 136 in a closure plate 137 inserted in the upper end of the housing 131. Pinned or otherwise secured to the opposite ends of each vertical shaft 135 are lower and upper bevel gears 138 and 139 respectively. The bevel gear 138 meshes with and drives the bevel gear 130. Mounted on each closure plate 137 is a housing 140 having opposite end plates 141 and 142 closing the outer and inner ends thereof (Figure 7). The end plates 142 are bored as at 143 to rotatably support the outer ends of two coaxial shafts 144 and 145. Pinned or otherwise drivingly secured to the outer end of each shaft 144 or 145 is a bevel gear 146 arranged to mesh with the bevel gear 139 on the vertical shaft 135.

Since the driving unit 16 is movable relatively to the driving unit 15, a sliding driving connection is provided between their respective driving shafts 144 and 145. For this purpose, the drive shaft 144 is recessed to receive a key 147 (Figure 7) which engages a longitudinal keyway 148 within a bore 149 in a hollow shaft or sleeve 150 pinned or otherwise drivingly secured to the end of the shaft 145 as at 151. The extreme outer end of the drive shaft 145 is recessed to receive a key 152 by which the hub of a drive pulley 153 is drivingly secured to the shaft 145. As a consequence, the rotation of the pulley 153 drives both shafts 144 and 145 through the sliding driving connection 147, 148 so as to rotate both roller driving shafts 107 and both roll driving wheels 110 and rings 116 in the same directions of rotation, so as to rapidly rotate the bearing roller or other workpiece W while it is being honed by the hone 68.

The pulley 153 is drivingly engaged by a belt 154 (Figure 1) which in turn is driven by a pulley 155 on the output shaft 156 of the reduction gear box 157 attached to an electric motor 158. The motor 158 and its reduction gear box 157 are bolted or otherwise suitably secured to a tiltable platform 159 mounted at one end on trunnions or pivot pins 160 supported by angle brackets 161, whereas the opposite end of the motor platform 159 is bored as at 162 (Figure 4) with an excessively large bore to loosely receive the threaded upper end portion 163 of a swinging rod 164, the lower end of which is provided with an eye 165 through which passes a pivot pin or bolt 166 mounted in and supported by a block 167. The upper and lower surfaces of the platform 159 surrounding the bore 162 are dished to receive convex washers 168 held therein by adjusting nuts 169. The tilting motor platform 159 is adjusted to swing upward or downward by this means in order to tighten or loosen the belt 154.

The base structure 100 of the fixed roller driving unit 15 is bolted or otherwise secured directly to the bed 11 (Figure 7), whereas the base 101 of the movable driving unit 16 is bolted or otherwise secured (Figure 5) to an intermediate plate 170 which in turn is mounted obliquely upon an upper slide 171 and bolted thereon (Figure 9). The upper slide 171 is grooved on its lower surface as at 172 (Figure 4) to receive a slide support 173 of T-shaped cross-section having its wider upper portion mounted in the groove 172 to guidingly and slidably support the slide 171. The slide support 173 is bolted to the bed 11 and on its bottom surface is likewise grooved as at 174 to slidably receive a lower slide 175. The upper slide 171 is retained in position by retaining bars 176 bolted to the underside thereof.

Bolted to the rearward edge and top surface of the upper slide 171 is an L-shaped bracket 177, the lower end of which (Figure 6) is engaged by one end of a compression spring 178, the opposite end of which is seated against a threaded adjusting member 179 which is threaded through a support 180 bolted to the bearing brackets 27 and 28 and extending therebetween. The L-shaped bracket 177 also carries a pivot pin 181 to which the rearward end of a link 172 is pivotally connected (Figure 6), the forward end being connected as at 182 to a pivot pin mounted on the lower end of a cam follower lever 183, the upper end of which carries an axle 184 supporting a cam follower roller 185 engaging the cam 27. The lever 183 is pivotally mounted on the pivot rod 94 (previously described). As a consequence, when the cam shaft 25 is rotated (Figure 6), the consequent rotation of the cam 37 rocks the lever 183 so as to reciprocate the upper slide 171.

Work supporting unit

Bolted to the lower slide 175 is an upwardly-extending bracket 187 (Figure 5) carrying a pivot pin 188 by which a link 189 is pivotally connected to a pin 190 on the lower end of a cam follower lever 191, the upper end of which carries an axle 192 rotatably supporting the cam follower roller 193. The latter is engageable with the cam 38. The cam follower lever 191 is pivotally mounted on a pivot rod 94 (Figure 5), previously described. A compression spring 194 similar to the spring 178 similarly engages the bracket 187 to urge the lower slide 175 and link 189 to the right (Figure 5), thereby swinging the lever 191 about its pivot rod 94 so as to urge the cam follower roller 193 against the periphery of the cam 38. An adjusting rod 195 is threaded through the support 180 in a manner similar to the adjusting member 179. Consequently, when the cam shaft 25 and cam 38 are rotated, the rocking of the lever 191 reciprocates the lower slide 175.

The work supporting unit 17, in addition to the lower slide 175, includes a vertically-extending work support, generally designated 196 (Figures 4, 5, 10, 11 and 13). This consists of an L-shaped bracket 197 (Figures 11 and 13) bolted to the end of the lower slide 175 and having a vertical guide groove 198 in its upper forward side wall which receives a guide rib 199 on a vertical support 200. The latter is slotted vertically as at 201 to receive clamping screws 202 which are threaded into the bracket 197. The latter has a horizontally-extending arm 203 through which is threaded an upwardly-extending stop screw 204 which engages the bottom of the support 200. The support 200 near its upper end is widened into a work rest 205 of inverted V-shaped cross-section (Figures 30 and 31) which is substantially the length of the roll or other workpiece W which it is to support. The work rest 205 preferably consists of an elongated insert 205a of tungsten carbide or other extremely hard wear-resisting material mounted on and secured to the upper end of the work support 200 (Figures 13, 30 and 31). Secured to the support 200 forwardly of the work rest 205 is a stop 206 against which the end of the workpiece W abuts. Bolted to the bed 11 (Figure 5) is a stop 207 against which the bracket 197 is urged by the coil spring 194 through the intermediate connection formed by the bracket 187 and lower slide 175. The stop 207 thus limits the inward motion of the lower slide 175 and work support 196.

Work feeding unit

The work feeding unit 18 is driven from the cam 39, which is a face cam having its cam path 39a on the side thereof (Figures 1 and 7). Engaging the cam path 39a of the cam 39 is a cam follower roller 210 mounted on a stud 211 which is secured in the upper end of an arm 212 pinned or otherwise drivingly secured to a shaft 213 which is rotatably mounted in spaced bearing brackets 214 bolted to the bed 11. Pinned or otherwise drivingly secured to the rearward end of the shaft 213 is the lower end of an arm 215 of approximately L-shaped outline (Figures 5 and 10) which is connected by pivot pins 216 and 217 and a link 218 to a head 219 on the enlarged rearward end 220 of a feed plunger 221. The enlarged portion 220 and the feed plunger 221 reciprocate in coaxial bores 222 and 223 respectively formed in a block 224, the upper portion of which is provided with a downwardly-inclined workpiece passageway 225 of approximately square cross-section closed by an overhanging member 226 bolted thereto (Figure 14).

Connection is made at the upper end of the workpiece passageway 225 to a workpiece delivery tube 227 by means of a tubular coupling 228 bolted to the upwardly-inclined face 229 of the block 224. As previously stated, the workpiece delivery tube 227 leads to conventional workpiece delivery mechanism (not shown) which is operated automatically by the cam 40 to deliver the workpiece rollers W one by one with their small ends always forward or downward, regardless of the position in which they are first presented to the delivery mechanism from the supply hopper. As also previously stated, such a suitable workpiece roller delivery apparatus is described and claimed in the Hommel Patent No. 2,490,872 of December 13, 1949, for Article Handling Apparatus.

The rollers W slide one by one downward through the tube 227 and passageway 225 onto the trough-shaped upper end 230 of a rocking workpiece transfer member 231 (Figures 16, 18 and 20) of bell crank form which is pivotally mounted on the stud 232 and has its lower arm provided with a socket 233 receiving the upper end of a compression spring 234 by which the transfer member 231 is constantly urged toward the movable roll driving unit 16. An adjusting screw 235 is threaded through the upper portion of the work transfer member 231 and is adapted to engage a contact pin 236 mounted in a bracket 237 which is bolted to the housing 102 of the movable work driving unit 16, so that as the housing 102 is reciprocated by the upper slide 171 and cam 37, it tilts the work transfer member 231. From Figures 17 and 19, it will be seen that the work delivery passageway 225 and the work feeding plunger bore 222 are located approximately side by side at their forward ends so that the trough-shaped portion 230 of the work transfer member 231 receives the workpiece in one position (Figure 17) and shifts it over into line with the workpiece plunger bore 222 (Figure 10), whence it is impelled onto the work rest 205 by the reciprocation of the plunger 221 (Figure 21). An adjustable stop pin 239 mounted on top of the head 219 prevents reciprocation of the work feeding plunger 221 beyond the desired point.

An approximately L-shaped stop member 240 is bolted to the side of the block 224 and has an upstanding stop portion 241 (Figures 12 and 13) which is interposed immediately beyond the trough-shaped portion 230 of the work transfer member 231 on the opposite side thereof from the outlet of the workpiece delivery passageway 225. This prevents rollers or other workpieces W from moving beyond the trough-shaped portion 230 due to the impetus which they acquire by gravity in dropping down through the tube 227 and passageway 225 (Figures 12 and 13).

In order to positively prevent a tapered roller from being presented large-end downward (as might happen in case the workpiece delivery apparatus above the tube 227 failed to function), a swinging stop device, generally designated 242, is provided (Figure 13). This consists of a lever 243 pivoted on a pivot pin 244 secured in a recess 245 in the upper forward portion of the block 224. The block 224 is bored and threaded to receive a thumb screw 246, the head of which overhangs the lever 243 so as to clamp it solidly downward against an abutment surface 248. Threaded downward through the forward end of the lever 243 is a stop screw 247 which rests upon the workpiece W when its small end is foremost. If, however, the large end of the workpiece is foremost, the large end is engaged by the stop screw 247 and the roller W is prevented from proceeding further. To release the lever 243, the head of the thumb screw 246 is turned ninety (90°) degrees, which then allows the lever 246 to be lifted and a roller W presented wrong end foremost to be removed.

The plunger 220 and swinging arm 215 (Figures 2 and 10) are urged inward by a tension spring 249, one end of which is secured to the arm 215 and the other end to a base 250 bolted to the bed 11 and having a horizontally bored boss 251 receiving the stud 232 previously mentioned. The block 224 rests in a recess 252 in the top of the base 250 (Figure 14) and is bolted or otherwise suitably secured to the upper portion of the base 250 by the screws 253 (Figure 12). The honed workpieces fall from the work rest 205 downward into an inclined chute 254 attached to the work support 196 (Figure 5) and thence into a second inclined chute 255 mounted on the bed 11 into a suitable receptacle (not shown).

Notwithstanding the above-described geometrical arrangement of the workpiece roller driving wheel 110, 117 and the work rest 196 relatively to the workpiece W (Figures 1 and 12), the tapered roller which constitutes the workpiece W exerts a certain amount of pressure against the honing or lapping ring 121 which causes the end of the roller W to be honed or lapped. To balance the time it takes to hone the body of the workpiece W, the pressure of the roller W against the honing ring 121 may be increased by removing the flat intermediate spacing plate 170 from beneath the movable driving unit 16, and substituting an inclined or tapered spacing member 270 (Figures 26 and 27) with its forwardly converging upper and lower surfaces 271 and 272. The convergence of these surfaces is very slight, being of the order of one half a degree, and is exaggerated in the drawings. This throws the axis of rotation off the apex point 273 of the roller W (Figure 1) so that the tapered or conical surface 117 of the driving ring 116 of the movable driving unit 16 converges to a new point 274 below the point 273 (Figure 27) and will contact the roller W on a point only until this driving ring 117 has worn itself to a curved contact with the roller W.

When the inclined or tapered spacing member 270 is used, a flexible hollow shaft 275 (Figures 28 and 29) is used in place of the hollow shaft 150 for driving the movable and now tilted driving unit 16 from the fixed driving unit 15. For this purpose, the hollow shaft or sleeve 150 (Figure 6) is removed and the shafts 144 and 145 provided with reduced diameter portions 276 and 277 respectively on which collars 278 and 279 are mounted and drivingly connected as by the keys 280 and 281 respectively (Figure 28). Mounted on and interconnecting the collars 278 and 279 is a flexible hollow shaft or sleeve 282 which is counterbored as at 283 and 284 at its opposite ends to receive the collars 278 and 279. Clamping ring halves 285 secured by the screws 286 to the collars 278 and 279 serve to clamp the ends of the rubber sleeve or hollow shaft 282 to the collars 278 and 279. The hollow shaft 282 is preferably made of a piece of rubber or synthetic rubber hose. A set screw 289 seated in a hole 290 in the collar 279 is threaded into a corresponding hole 291 in the shaft 145.

In place of the tungsten carbide work rest 205, 205a previously described, and consisting of an elongated member of inverted V-shaped or triangular cross-section (Figures 30 and 31), the modified work rest 292 may be used (Figures 32 and 33). This consists of an elongated piece of tungsten carbide or other suitable wear-resisting material mounted on the work rest 205 at the upper end of the work support 196. The modified work rest 292, however, is of approximately trapezoidal cross-section having a flat top and inclined or beveled sides (Figure 31). It is used in the same manner as the work rest 205a previously described.

Prior to the operation of the invention, let it be assumed that the machine has been adjusted so that the apexes of the conical surfaces 117 of the driving wheel peripheries 116 coincide with the apex 273 of the tapered surface of the workpiece W and that the abrading surface of the hone 68 and the work rest 205 are aligned with this common point. The curved surface, if used, on the lapping ring or honing ring 122a is also centered at this common point.

Operation

In the operation of the invention, let it be assumed that the chute 227 and passageway 225 have been filled with rollers arranged with their small ends downward. This is done to insure that the roller closest to the stop 241 is pushed all the way down past the stop screw 247. If not, it cannot be transferred to the loading position. Let it be assumed that a roller W is in place between the drive rolls and that the motors 49 and 158 have been started by closing a suitable switch (not shown), making the honing unit 13 and driving units 15 and 16 run continuously. The closing of another switch (not shown) starts the motor 19, driving the cam shaft 25.

As the cam shaft 25 starts to run, the cam 35 first raises the lap or hone 68 away from the workpiece W. Next the cams 37 and 38 simultaneously move the slides 171 and 175. The slide 171 moves the roller driving unit 16 and slide 175 moves the work supporting unit 17, the former a slightly greater distance than the latter (Figures 16 to 24). When the work support 205 has moved away from the fixed roll driving unit 15, the honed roller will fall in the space onto the chutes 254 and 255 (Figure 5). As the two slides 171 and 175 have moved to their extreme outward positions, which are the loading positions, the transfer arm 231 has also moved simultaneously until it has reached the stop 249 (Figure 18) which also is its loading position. The spring 234 keeps the lever 231 with the screw 235 tight against the button 236 which is fastened to the roller driving unit 16. As the movable roller driving unit 16 moves outward, the lever 231 follows until it reaches the stop 240. The transfer lever has now carried a roller W with it from the chute 225 to the loading position.

At this time, there is a slight dwell on the cams 37 and 38 to allow the cam 39 to operate the loading plunger 221 which now pushes the roller W out of the transfer arm 231 onto a V-shaped nest formed by the work rest 205 and the driving ring 116 (Figure 22). After the loading plunger 221 has been withdrawn, the cams 37 and 38 allow the slides 171 and 175 to be moved simultaneously by the springs 178 and 194 until the slide 175 is stopped by the block 207. The roller is still nested between the work rest 205 and the driving ring 116, as shown in Figure 23.

As the slide 171 completes its stroke, the driving ring 116 of the movable driving unit 16 will force the work up the slight incline on the work rest 205 and then horizontally until the work is pinched between the two driving rings 116. The slight clearance between the head of the roller W and the lapping or honing ring 121, 122 required for loading, will immediately be taken up by the axial motion of the roller W due to the axial force exerted on it by the rotating tapered driving rings 116.

The transfer arm 231 is now back in its original position ready to receive another roller W (Figure 16) and the cam 35 has now allowed the oscillating stone 68 to be lowered onto the work. Both the body and end of the roller W are now being honed simultaneously. Meanwhile, the cam 40 has operated the workpiece delivery mechanism (not shown) including a hopper and turnover device, to allow one roller W to drop into the workpiece delivery tube 227 and thence into the chute 225 for each one removed. When the various units of the machine have moved into the honing position, the cam 34 actuates an electric limit switch 31 which resets the previously-mentioned solenoid-operated timing device (not shown). As the switch 31 resets the timer, it also breaks the circuit of the motor 19 and does not close it again until the timer has completed its predetermined time cycle. In this way, the length of the honing time may be varied without changing the loading and unloading time.

As previously stated, the brake 36 on the cam shaft 25 will prevent the cam shaft 25 from overrunning due to its inertia, and since the cam shaft rotates only one revolution per operating cycle, overheating due to friction cannot occur. When the timer reaches the end of its set period and again closes the circuit of the motor 19, the cam shaft 25 starts rotating and the cams again operate the various mechanisms in the manner previously described.

If, by accident, a workpiece W should fall downward through the delivery tube 227 wrong end foremost, so that the large end emerged first from the bottom of the delivery passageway 225 (Figure 13), this large end would immediately be intercepted by the bottom of the stop screw 247 on the swinging stop device 242, hence would not be permitted to advance and be transferred by the transfer member 231. The operator would detect this from the fact that no rolls were being fed, and would remove the wrongly-presented roller or workpiece W merely by turning the thumb screw 246 ninety degrees, permitting the device 242 to be swung upward, thereby enabling the operator to remove the wrongly-presented roller W. The operation of the machine would then proceed properly.

Figures 34, 35, 36 and 37 illustrate how the wear of the honing stone 68 is automatically compensated for during operation. The pair of spaced vertical dotted lines interconnecting the hone stone 68 and the guide member 57 merely indicate that these members are actually connected to one another and move up and down as a unit. Figure 34 shows a new stone 68 lowered into engagement with the workpiece W and the relative position of the screw 81 to the contact button 79 when the bell crank arm 82 is in its lowest position. Figure 35 shows a new stone 68 retracted to its highest position and the relative position of the screw 81 to the button 79, when the bell crank arm 82 is raised to its highest position. Figure 36 shows a worn down stone 68 lowered into engagement with the workpiece W and the relative position of the screw 81 to the button 79, when the bell crank arm 82 is lowered to its lowest position. Figure 37 shows a worn down stone 68 retracted to its highest position and the relative position of the screw 81 to the button 79, when the bell crank arm 82 is raised to its highest position. The distance A between the face of the stone holder 67 and the face of the button 79 is a constant as is the stroke B of the crank arm 82. The screw 81 is initially adjusted in such a manner that when the stone 68 is new and resting on the work, the distance D of the contact screw 80 below the contact button 79 will be $$D \text{ equals } B-C$$

where C is the minimum clearance permissible between the stone 68 and the workpiece W (Figure 35). As the stone 68 wears down, the distance D becomes smaller and the clearance C increases. When the distance D becomes zero (Figures 36 and 37), the stone is worn out and will not hone any longer, and must be replaced. By inspecting the work periodically, the operator can tell when to replace the stone. Figure 39 illustrates the position of a worn out stone with no workpiece in place.

The stroke B of the bell crank arm 82 and the height E of the honing stone 68 must be so proportioned that the distance D is smaller than the diameter of the workpiece W when the stone 68 is new. This will permit the stone 68 to be lowered to its full extent when no workpiece is in place without becoming damaged, as shown in Figure 38.

The operation of the modified driving unit arrangement shown in Figures 26 and 27 is generally similar to that of the form of the invention shown in Figures 1 to 25 inclusive except that the tilting of the axis of rotation of the driving ring 116 of the movable drive unit 16 creates a crowding action upon the tapered roller W so as to force it more positively against the honing or lapping ring 121. This results from the fact that the axis of rotation of the movable driving unit 16 is no longer coincident with the apex point 273 but passes below it. This arrangement, as previously stated, enables the time of honing or lapping the end of the roller W to be balanced against the time required for honing the body of the workpiece W.

What I claim is:

1. A roll honing machine comprising a supporting structure, a work rest mounted on said supporting structure for motion relatively thereto, a pair of motor-operated roll driving wheels rotatably mounted on said supporting structure and engageable with a roll on said work rest, a roll feeder having an outlet disposed adjacent said work rest, a roll honing device disposed adjacent said work rest and having a movable hone engageable with a roll on said work rest, mechanism for shifting one of said driving wheels relatively to the other driving wheel, and mechanism for shifting said work rest relatively to one of said driving wheels.

2. A roll honing machine comprising a supporting structure, a work rest mounted on said supporting structure for motion relatively thereto, a pair of motor-operated roll driving wheels rotatably mounted on said supporting structure and engageable with a roll on said work rest, a roll feeder having an outlet disposed adjacent said work rest, a roll honing device disposed adjacent said work rest and having a movable hone engageable with a roll on said work rest, mechanism for shifting one of said driving wheels relatively to the other driving wheel, and mechanism for shifting said work rest relatively to one of said driving wheels in timed relationship with said driving wheel shifting mechanism.

3. A roll honing machine comprising a supporting structure, a work rest mounted on said supporting structure for motion relatively thereto, a pair of motor-operated roll driving wheels rotatably mounted in said supporting structure and engageable with a roll on said work rest, a roll feeder having an outlet disposed adjacent said work rest, a roll transfer device movably mounted adjacent said work rest and said feeder outlet, mechanism for moving said transfer device between said outlet and said work rest in timed relationship with said driving wheel shifting mechanism, a roll honing device disposed adjacent said work rest and having a movable hone engageable with a roll on said work rest, mechanism for shifting one of said driving wheels relatively to the other driving wheel, and mechanism for shifting said work rest relatively to one of said driving wheels.

4. A roll honing machine comprising a supporting structure, a work rest mounted on said supporting structure for motion relatively thereto, a pair of motor-operated roll driving wheels rotatably mounted in said supporting structure and engageable with a roll on said work rest, a roll feeder having an outlet disposed adjacent said work rest, a roll transfer device movably mounted adjacent said work rest and said feeder outlet, mechanism for moving said transfer device between said outlet and said work rest in timed relationship with said driving wheel shifting mechanism, a roll honing device disposed adjacent said work rest and having a movable hone engageable with a roll on said work rest, mechanism for shifting one of said driving wheels relatively to the other driving wheel, and mechanism for shifting said work rest relatively to one of said driving wheels in timed relationship with said driving wheel shifting mechanism.

5. A roll honing machine comprising a supporting structure, a work rest mounted on said supporting structure for motion relatively thereto, a pair of motor-operated roll driving wheels rotatably mounted on said supporting structure and engageable with a roll on said work rest, a roll feeder having an outlet disposed adjacent said work rest, a roll honing device disposed adjacent said work rest and having a movable hone engageable with a roll on said work rest, mechanism for shifting one of said driving wheels relatively to the other driving wheel, and mechanism for shifting said work rest relatively to one of said driving wheels, and mechanism for moving said hone into and out of engagement with a roll on said work rest.

6. A roll honing machine comprising a supporting structure, a work rest mounted on said supporting structure for motion relatively thereto, a pair of motor-operated roll driving wheels rotatably mounted in said supporting structure and engageable with a roll on said work rest, a roll feeder having an outlet disposed adjacent said work rest, a roll transfer device movably mounted adjacent said work rest and said feeder outlet, mechanism for moving said transfer device between said outlet and said work rest in timed relationship with said driving wheel shifting mechanism, a roll honing device disposed adjacent said work rest and having a movable hone engageable with a roll on said work rest, mechanism for shifting one of said driving wheels relatively to the other driving wheel, mechanism for shifting said work rest relatively to one of said driving wheels, and mechanism for moving said hone into and out of engagement with a roll on said work rest.

7. A roll honing machine comprising a supporting structure, a stationary roll driving unit mounted on said structure and having a rotary roll driving wheel thereon, a work rest mounted on said supporting structure adjacent said stationary roll driving unit, a movable roll driving unit mount shiftably mounted on said structure for travel toward and away from said stationary roll driving unit, a movable roll driving unit mounted on said mount and having a rotary driving wheel, a roll feeder having an outlet disposed adjacent said work rest, a roll honing device disposed adjacent said work rest and having a movable hone engageable with a roll on said work rest, a timing element mounted on said supporting structure, a motor drivingly connected to said timing element, and mechanism operatively connecting said timing element to said movable mount for automatically shifting said mount and movable roll driving unit in timed sequence toward and away from said stationary roll driving unit.

8. A roll honing machine comprising a supporting structure, a stationary roll driving unit mounted on said structure and having a rotary roll driving wheel thereon, a work rest mounted on said supporting structure adjacent said stationary roll driving unit, a movable roll driving unit mounted on said structure for travel toward and away from said stationary roll driving unit and having a rotary driving wheel, a roll feeder having an outlet disposed adjacent said work rest, a roll honing device disposed adjacent said work rest and having a movable hone engageable with a roll on said work rest, and mechanism for shifting said movable roll driving unit toward and away from said stationary roll driving unit, said roll driving wheels having beveled rims and their axes of rotation disposed at an acute angle to one another.

9. A roll honing machine comprising a supporting structure, a stationary roll driving unit mounted on said structure and having a rotary roll driving wheel thereon, a work rest mounted on said supporting structure adjacent said stationary roll driving unit, a movable roll driving unit mount shiftably mounted on said structure for travel toward and away from said stationary roll driving unit, a movable roll driving unit mounted on said mount and having a rotary driving wheel, a roll feeder having an outlet disposed adjacent said work rest, a roll transfer device movably mounted for travel between said work rest and the outlet of said feeder, a roll honing device disposed adjacent said work rest and having a movable hone engageable with a roll on said work rest, a timing element mounted on said supporting structure, a motor drivingly connected to said timing element, and mechanism operatively connecting said timing element to said movable mount for automatically shifting said mount and movable roll driving unit in timed sequence toward and away from said stationary roll driving unit.

10. A roll honing machine comprising a supporting structure, a stationary roll driving unit mounted on said structure and having a rotary roll driving wheel thereon, a work rest movably mounted on said supporting structure adjacent said stationary roll driving unit, a movable roll driving unit mounted on said structure for travel toward and away from said stationary roll driving unit and having a rotary roll driving wheel, a roll feeder having an outlet disposed adjacent said work rest, a roll honing device disposed adjacent said work rest and having a movable hone engageable with a roll on said work rest, mechanism for shifting said movable roll driving unit toward and away from said stationary roll driving unit, and mechanism for shifting said work rest toward and away from said stationary roll driving unit.

11. A roll honing machine comprising a supporting structure, a stationary roll driving unit mounted on said structure and having a rotary roll driving wheel thereon, a work rest movably mounted on said supporting structure adjacent said stationary roll driving unit, a movable roll driving unit mounted on said structure for travel toward and away from said stationary roll driving unit and having a rotary roll driving wheel, a roll feeder having an outlet disposed adjacent said work rest, a roll honing device disposed adjacent said work rest and having a movable hone engageable with a roll on said work rest, mechanism for shifting said movable roll driving unit toward and away from said stationary roll driving unit, and mechanism operable in timed relationship with said movable roll driving unit shifting mechanism for shifting said work rest toward and away from said stationary roll driving unit.

12. A roll honing machine comprising a supporting structure, a stationary roll driving unit mounted on said structure and having a rotary roll driving wheel thereon, a work rest mounted on said supporting structure adjacent said stationary roll driving unit, a movable roll driving unit mounted on said structure for travel toward and away from said stationary roll driving unit and having a rotary driving wheel, a roll feeder having an outlet disposed adjacent said work rest, a roll honing device disposed adjacent said work rest and having a movable hone engageable with a roll on said work rest, mechanism for shifting said movable roll driving unit toward and away from said stationary roll driving unit, and mechanism for actuating said roll feeder in timed relationship with said movable roll driving unit shifting mechanism.

13. A roll honing machine comprising a supporting structure, a stationary roll driving unit mounted on said structure and having a rotary roll driving wheel thereon, a work rest movably mounted on said supporting structure adjacent said stationary roll driving unit, a movable roll driving unit mounted on said structure for travel toward and away from said stationary roll driving unit and having a rotary roll driving wheel, a roll feeder having an outlet disposed adjacent said work rest, a roll honing device disposed adjacent said work rest and having a movable hone engageable with a roll on said work rest, mechanism for shifting said movable roll driving unit toward and away from said stationary roll driving unit, mechanism for shifting said work rest toward and away from said stationary roll driving unit, and mechanism for actuating said roll feeder in timed relationship with said movable roll driving unit shifting mechanism and with said work rest shifting mechanism.

14. A roll honing machine comprising a supporting structure, a work rest mounted on said supporting structure, a pair of motor-operated roll driving wheels rotatably mounted on said supporting structure and engageable with a roll on said work rest, a roll feeder having an outlet disposed adjacent said work rest, a roll honing device disposed adjacent said work rest and having a movable hone engageable with a roll on said work rest, mechanism for shifting one of said driving wheels relatively to the other driving wheel, and a roll end abrading member arranged in proximity to said work rest and abradingly engageable with said roll.

15. A roll honing machine comprising a supporting structure, a work rest mounted on said supporting structure, a pair of motor-operated roll driving wheels rotatably mounted on said supporting structure and engageable with a roll on said work rest, a roll feeder having an outlet disposed adjacent said work rest, a roll honing device disposed adjacent said work rest and having a movable hone engageable with a roll on said work rest, mechanism for shifting one of said driving wheels relatively to the other driving wheel, a roll and abrading member arranged in proximity to said work rest and abradingly engageable with said roll, and mechanism drivingly connected to said abrading member for moving said abrading member relatively to said roll.

16. A roll honing machine comprising a supporting structure, a work rest mounted on said supporting structure, a pair of motor-operated roll driving wheels rotatably mounted on said supporting structure and engageable with a roll on said work rest, a roll feeder having an outlet disposed adjacent said work rest, a roll honing device disposed adjacent said work rest and having a movable hone engageable with a roll on said work rest, mechanism for shifting one of said driving wheels relatively to the other driving wheel, and a roll end abrading member arranged in proximity to said work rest and abradingly engageable with said roll, said abrading member being connected to and rotated by one of said driving wheels.

17. A roll honing machine comprising a supporting structure, a work rest mounted on said supporting structure, a pair of motor-operated roll driving wheels rotatably mounted on said supporting structure and engageable with a roll on said work rest, a roll feeder having an outlet disposed adjacent said work rest, a roll honing device disposed adjacent said work rest and having a movable hone engageable with a roll on said work rest, mechanism for shifting one of said driving wheels relatively to the other driving wheel, and a roll end abrading member arranged in proximity to said work rest and abradingly engageable with said roll, said abrading member having a curved abrading surface thereon with its center of curvature disposed substantially coincident with the apex of the tapered side surface of said roll.

18. A roll honing machine comprising a supporting structure, a first slide and a second slide movably mounted on said supporting structure, a work rest mounted on said first slide, a stationary roll driving wheel mount secured to said supporting structure, a pair of motor-operated roll driving wheels rotatably mounted on said second slide and said stationary mount respectively and engageable with a roll on said work rest, a roll feeder including a roll supply chute having an outlet disposed adjacent said work rest, a roll honing device disposed adjacent said work rest and having a movable hone engageable with a roll on said work rest, and motor driven mechanism including cams and cam followers operatively connected to said slides and to said roll feeder, said cam followers shifting said slides and said feeder in timed relationship relatively to one another.

19. A roll honing machine comprising a supporting structure, a first slide and a second slide movably mounted on said supporting structure, a work rest mounted on said first slide, a stationary roll driving wheel mount secured to said supporting structure, a pair of motor-operated roll driving wheels rotatably mounted on said second slide and said stationary mount respectively and engageable with a roll on said work rest, a roll feeder including a roll supply chute having an outlet disposed adjacent said work rest, a movable roll transfer member having a roll receiving portion movable therewith to and fro between said outlet and said work rest, a movable roll feeding member mounted adjacent said outlet and reciprocable relatively thereto to eject rolls therefrom to said roll-receiving portion, a roll honing device disposed adjacent said work rest and having a movable hone engageable with a roll on said work rest, and motor-driven mechanism including cams and cam followers operatively connected to said slides and to said movable members, said cam followers shifting said slides and said movable members in timed relationship relatively to one another.

20. A roll honing machine comprising a supporting structure, a work rest mounted on said supporting structure, a pair of motor-operated roll driving wheels rotatably mounted on said supporting structure and engageable with a roll on said work rest, a roll feeder having an outlet disposed adjacent said work rest, a roll honing device disposed adjacent said work rest and having a movable hone engageable with a roll on said work rest, mechanism for shifting one of said driving wheels relatively to the other driving wheel, and a roll interceptor associated with said roll feeder and adapted to engage the large end of a roll when initially presented.

21. A roll honing machine comprising a supporting structure, a work rest mounted on said supporting structure, a pair of motor-operated roll driving wheels rotatably mounted on said supporting structure and engageable with a roll on said work rest, a roll feeder having an outlet disposed adjacent said work rest, a roll honing device disposed adjacent said work rest and having a movable hone engageable with a roll on said work rest, mechanism for shifting one of said driving wheels relatively to the other driving wheel, and a roll interceptor comprising a pivoted stop member pivotally mounted adjacent said roll feeder outlet, said interceptor being associated with said roll feeder and adapted to engage the large end of a roll when initially presented.

22. A roll honing machine for honing tapered rolls comprising a supporting structure, a stationary roll driving unit mounted on said structure and having a rotary roll driving wheel thereon, a work rest mounted on said supporting structure adjacent said stationary roll driving unit, a movable roll driving unit mounted on said structure for travel toward and away from said stationary roll driving unit and having a rotary driving wheel, a roll feeder having an outlet disposed adjacent said work rest, a roll honing device disposed adjacent said work rest and having a movable hone engageable with a roll on said work rest, and mechanism for shifting said movable roll driving unit toward and away from said stationary roll driving unit, said roll driving wheels having beveled rims and their axes of rotation disposed at an acute angle to one another and converging to a common point coincident with the apex of the tapered roll.

23. A roll honing machine for honing tapered rolls comprising a supporting structure, a stationary roll driving unit mounted on said structure and having a rotary roll driving wheel thereon, a work rest mounted on said supporting structure adjacent said stationary roll driving unit, a movable roll driving unit mounted on said structure for travel toward and away from said stationary roll driving unit and having a rotary driving wheel, a roll feeder having an outlet disposed adjacent said work rest, a roll honing device disposed adjacent said work rest and having a movable hone engageable with a roll on said work rest, and mechanism for shifting said movable roll driving unit toward and away from said stationary roll driving unit, said roll driving wheels having beveled rims and their axes of rotation disposed at an acute angle to one another, said axes and said beveled rims converging into coincidence with the apex of the tapered roll.

24. A roll honing machine for honing tapered rolls comprising a supporting structure, a stationary roll driving unit mounted on said structure and having a rotary roll driving wheel thereon, a work rest mounted on said supporting structure adjacent said stationary roll driving unit, a movable roll driving unit mounted on said structure for travel toward and away from said stationary roll driving unit and having a rotary driving wheel, a roll feeder having an outlet disposed adjacent said work rest, a roll honing device disposed adjacent said work rest and having a movable hone engageable with a roll on said work rest, and mechanism for shifting said movable roll driving unit toward and away from said stationary roll driving unit, said roll driving wheels having beveled rims and their axes of rotation disposed at an acute angle to one another, one of said driving wheels having its axis and its beveled rim converging into coincidence with the apex of the tapered roll and the other driving wheel having its axis and its beveled rim converging to a common point displaced from said apex.

HERMAN A. ORTEGREN.

REFERENCES CITED

The following references are of record in the file of this patent:

UNITED STATES PATENTS

| Number | Name | Date |
| --- | --- | --- |
| 891,992 | Hess | June 30, 1908 |
| 1,669,728 | Vanderbeek | May 15, 1928 |
| 1,788,046 | Binns et al. | Jan. 6, 1931 |
| 1,847,466 | Binns | Mar. 1, 1932 |
| 2,002,317 | Hoke | May 21, 1835 |
| 2,243,371 | Blood | May 27, 1941 |
| 2,270,525 | Johnson | Jan. 20, 1942 |
| 2,433,455 | Hutchinson | Dec. 30, 1947 |
| 2,479,112 | Hegeman | Aug. 16, 1949 |